Patented Sept. 19, 1950

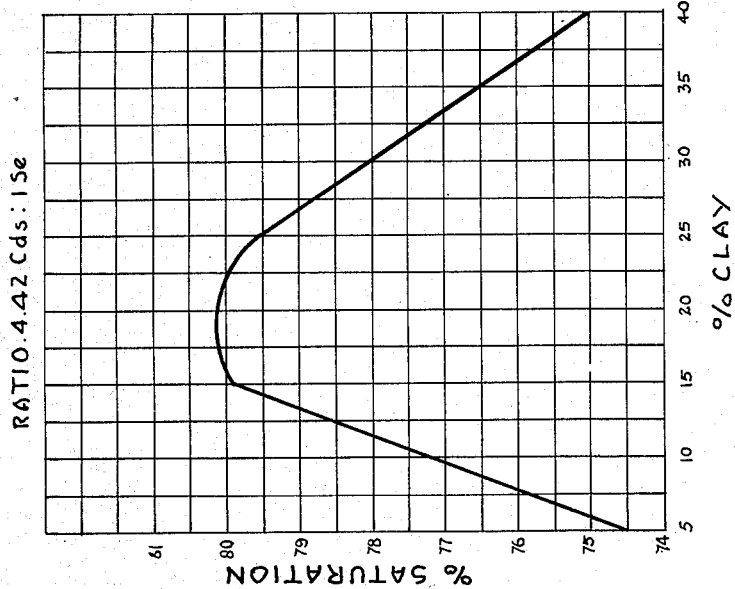
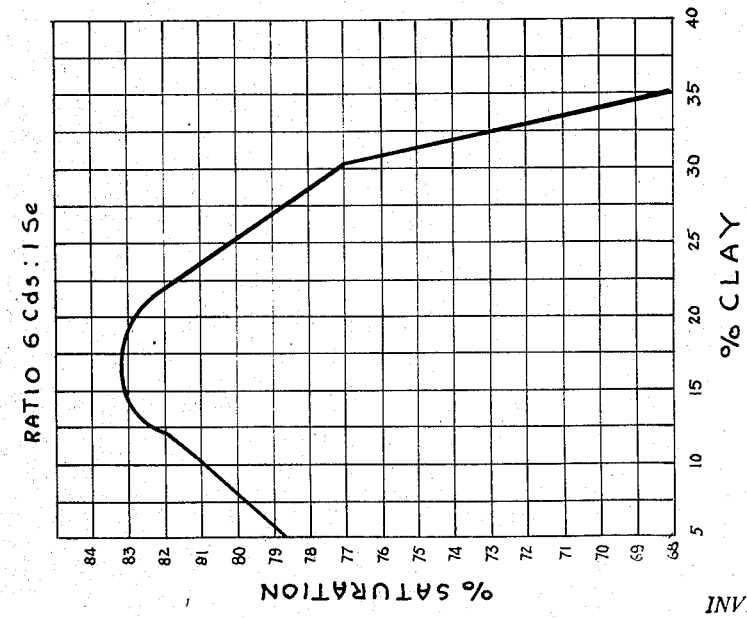

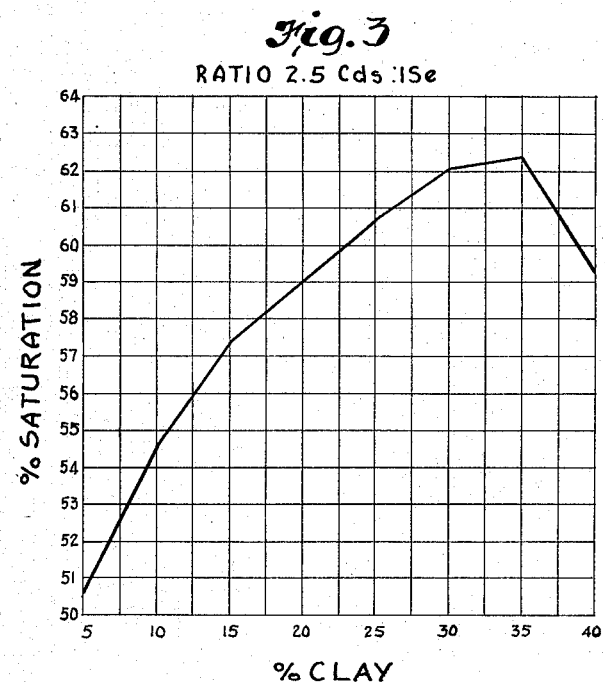

2,523,119

UNITED STATES PATENT OFFICE 2,523,119

PIGMENT AND METHOD OF PRODUCING SAME

Orville O. Kenworthy, Lakewood, Ernest H. Goda, East Cleveland, and Jack D. Golland, Shaker Heights, Ohio, assignors to Ferro Enamel Corporation, Cleveland, Ohio, a corporation of Ohio Application December 31, 1947, Serial No. 795,054

8 Claims. (Cl. 106—301)

This invention relates to a new cadmium-selenium pigment ranging in color from orange to dark red, and to an improved method for the manufacture of such pigment.

The pigments of our invention will be found useful in the pigmentation of organic high polymers, paints, and ceramic materials.

Cadmium-selenium pigments of the type heretofore produced either made by the direct calcination or co-precipitation process have been notably deficient in saturation or strength, covering power or tinting strength, and cleanliness.

It is a principal object of our invention to provide a novel process which results in a new pigment which is an improvement in the particulars above pointed out in which similar prior art pigments have been deficient.

It is a further object of our invention to provide a pigment of the character described characterized by high saturation, stability at high temperatures, and relative insolubility in water and organic solvents.

Other objects of the invention will appear as the description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 1 is a curve showing the percent saturation of the pigment produced by the use of various percentages of clay in a cadmium sulphide to selenium ratio of 6 to 1;

Fig. 2 is a similar curve for a cadmium sulphide to selenium ratio of 4.42 to 1; and Fig. 3 is a similar curve for a cadmium sulphide to selenium ratio of 2.5 to 1.

Broadly stated, this invention comprises the provision of a new highly saturated cadmium-selenium pigment ranging in color from orange to deep red being relatively stable at temperatures up to about 1800° F. and being relatively insoluble in water and organic solvents and which may be produced by calcining cadmium sulphide, selenium and a clay-like substance. In the preferred embodiments of my invention, the calcined mass will contain a cadmium sulphide to selenium ratio in the range of from 9 to 1.25 parts of cadmium sulphide to 1 part of selenium and with the entire mass containing from about 10% to about 40% and preferably from about 15% to 35% of a clay-like substance. The mass to be calcined may be produced in either of two ways, such as by an admixture of cadmium sulphide and selenium or by the co-precipitation of a cadmium salt of a mineral acid with a seleno-sulphide in the presence of a clay-like substance as in the form of a slurry.

As illustrative of the several ways in which the process of our invention may be carried out in the production of our new and improved pigment, reference may be had to the following examples:

Example I

Into a $CdSO_4$ solution containing 103.8 lbs. of Cd metal was slurried 41.8 lbs. of clay. To this was added a sodium-sulfo-selenide solution containing 33.7 lbs. of selenium and 74.75 lbs. of sodium sulphides. The resultant precipitate was filtered, washed free of soda salts, and then completely dried at 250° F. This hard cake was then pulverized and calcined at 1100° F. for 3½ hours. This gave a clean red pigment of 74% saturation and a hue angle of 77°-28' when tested at 1% concentration in thermosetting plastic.

Example II

Into a $CdSO_4$ solution containing 103.6 lbs. of Cd metal was slurried 37.2 lbs. of clay. To this was added a sodium-sulfo-selenide solution containing 15.7 lbs. of selenium and 73.47 lbs. of sodium sulphide. The resultant precipitate was filtered, washed free of soda salts, and completely dried at 250° F. This hard cake was pulverized and calcined at 1100° F. for 1 hour, 15 minutes.

This gave a clean bright pigment of 90.15% saturation and a hue angle of 70°-59' when tested in porcelain enamel at 4% color.

Example III

Into a $CdSO_4$ solution containing 105.9 lbs. of Cd metal was slurried 39.7 lbs. of clay. To this was added a sodium-sulfo-selenide solution containing 22.7 lbs. of Se and 75.02 lbs. of $Na_2S$. The resultant precipitate was filtered, washed free of soda salts, and completely dried at 250° F. This hard cake was then pulverized and calcined at 1100° F. for 2 hours.

This gave a clean bright pigment of 84.31% saturation and a hue angle of 73°-44' when used at 1% concentration in thermosetting plastic, and 85.05% saturation and a hue angle of 75°-01' when used at 4% concentration in porcelain enamel.

From the foregoing examples it will be observed that a change in the proportional relationship between the amount of cadmium sulphide and selenium present results in a change in color of the pigment produced. In general, in producing pigments which vary in color from deep red to orange, one may employ from 9–1.25 parts of cadmium sulphide to 1 part of selenium. Using 1.25 parts of cadmium sulphide to 1 part of selenium will provide a pigment of a deep maroon or very dark red. As the amount of cadmium sulphide is increased the color will range down through the light reds to the orange approaching the full yellow color of the cadmium sulphide. In each of the examples the clay used was a mixture of three different ball clays mined in Tennessee and Kentucky, the approximate analysis of which is given in the following table:

| | Per cent |
|---|---|
| $SiO_2$ | About 50 |
| $Al_2O_3$ | About 31 |
| $Fe_2O_3$ | About 0.6 |
| $TiO_2$ | About 1.3 |
| CaO | About 0.2 |
| MgO | About 0.3 |
| $K_2O$ | About 2.0 |
| $Na_2O$ | About 0.3 |
| Ignition loss | About 13.6 |

The individual clays thus blended together in the preparation of the specific clay used in each of the three examples given above are known commercially as "white burning" clays and differ from each other principally in their organic content. In addition to the clay used in the three specific examples given above, we have also successfully employed bentonite, Georgia kaolin, montmorillinite, pyrophyllite, and attapulgus. In addition to true clays such as the substances enumerated above, successful results have been secured by the use of materials such as fuller's earth and diatomaceous earth. In the appended claims, therefore, we have identified the materials useful for this purpose as "clay-like substances" which term is intended to include all of the previously enumerated materials and their equivalents.

By having reference to the three figures in the attached drawings it will be observed that the strength of the pigments of our invention is very strongly influenced by the use of clay-like substances in rather definite percentage ranges. Fig. 1, in which is plotted the data on a pigment produced from a cadmium sulphide to selenium ratio of 6 to 1, shows that in that type of pigment, which is an orange color, the critical amount of clay used should fall within the percentage range of from 10% to about 25% with the maximum effectiveness secured by the use of about 15% to 20% of clay.

Fig. 2 relates to a red pigment produced from a cadmium sulphide to selenium ratio of from 4.42 to 1. In that pigment the graph shows that for optimum results the clay should be employed in the percentages of from about 12.5 to about 27.5% with best results secured in the range of from 15 to 22.5% of clay.

Fig. 3 gives the data on a maroon pigment having a cadmium sulphide to selenium ratio of 2.5 to 1. In that pigment the optimum range of clay for best results extends from about 25 to about 37.5% with the maximum saturation secured by the use of about 35% of clay. While the optimum amount of clay for each of the three pigments is somewhat different, it may nevertheless be stated that for the pigments having the range of color contemplated by this invention the clay should be used in an amount such that the calcined mass will contain from about 10% to 40% clay and preferably from about 15% to about 35% of clay.

In the foregoing description of the properties of the pigments produced by each of the three specific examples given reference is had to certain phraseology by which the color characteristics of the pigment are described.

At present, there is a wide divergence between the methods used in color recording and reporting and an equal divergence in methods of color measurement.

As a consequence it was deemed advisable to develop a color "language" which can be used and understood by those concerned with the development, production, use, and sale of colors or colored materials.

Unless we delve somewhat deeply into its physics and psychology, the language of color is comparatively simple.

Any color can be completely described in terms of three properties: Lightness, hue, and saturation.

Lightness tells how much of the light falling upon an object is reflected by it or transmitted through it.

Hue is the quality of this reflected or transmitted light, whether it is red, yellow, blue, or some intermediate.

Saturation is the purity or strength of the hue, that is, how far it departs from a neutral gray of the same lightness.

Black, all neutral grays and white, have no hue, and are called achromatic, to distinguish them from chromatic colors such as red or yellow. They have only one of the attributes of color, this is, lightness.

The hue and saturation of a color, taken together, are termed its "chromaticness" and when we have measured them we have measured its "chromaticity."

Perhaps one of the most convenient instruments for approximate color measurement is the Hunter multipurpose reflectometer, using its standard amber, green, and blue filters. The instrument is completely described in the literature, and there is no need here to dwell on its theory, construction, or operation.

The photo-electric tristimulus values obtained from the amber, blue, and green filters of the Hunter instrument are interpreted by mathematical formulae into lightness, percent saturation, and hue angle.

In this manner we are able to attribute definite numerical factors to a color and thus avoid the use of superfluous and indefinite adjectives.

In each of the three examples given above the pigment was produced by the co-precipitation process, i. e. a process in which cadmium sulphate and selenium were co-precipitated with the clay from a solution containing cadmium sulphate and sodium sulfo-selenide. Instead of the combination of salts used in each of the first three examples given above, satisfactory results may be secured by the use of other combinations of salts such as those indicated below.

The use of a cadmium nitrate solution may be co-precipitated with the clay by a barium seleno-sulphide solution; a cadmium chloride solution may be co-precipitated in the presence of the clay with a barium seleno-sulphide solution; these above mentioned cadmium solutions may be co-precipitated in the presence of other water soluble selenides other than the barium salt.

The co-precipitation process for the preparation of our improved pigments as represented by the three examples given above is the preferred process and results in pigments of preferred properties. We have also prepared cadmium sulfo-selenide pigments ranging in color from orange to deep maroon by the direct calcination process as represented by the following example:

*Example IV*

Sixty pounds of cadmium sulphide ground to a fineness of 100 mesh was mechanically mixed with 10 lbs. of selenium metal ground to a fineness of 100 mesh with 21 lbs. of the same type of clay used in the preparation of Examples 1–3 above. The entire mixed mass was then calcined at 1100° F. for 2½ hours' time. This gave a clean bright pigment of 81.60% saturation and a hue angle of 71°-28' when tested in a thermosetting plastic at 1% color.

It will be observed that in the foregoing example the ultimate pigment contains about 30% of clay. While pigments produced by this direct calcination process using substantial amounts of clay are generally lower in saturation and have a somewhat lower hue angle they are nevertheless entirely satisfactory for certain purposes. Because of the very high cost of the selenium and cadmium content of the pigment, the use of substantial amounts of clay results in a decided saving in cost because of the extremely low cost of the clay used.

The clay present in the product resulting from the direct calcination process is not in any sense of the word a diluent. This fact is clearly demonstrated by a series of batches made using varying amounts of clay up to 35%. In the following table will be found given the data with regard to the saturation and hue angle of a number of pigments produced utilizing a cadmium sulphide to selenium ratio of 6 to 1 and with clay used in amounts up to 35%.

| Per Cent Clay | Per Cent Saturation | Per Cent Hue Angle |
|---|---|---|
| 0 | 81.76 | 72° 05' |
| 5 | 81.70 | 72° 06' |
| 10 | 81.61 | 72° 13' |
| 15 | 81.37 | 71° 45' |
| 20 | 81.44 | 71° 44' |
| 25 | 81.81 | 71° 33' |
| 30 | 81.60 | 71° 28' |
| 35 | 80.82 | 71° 19' |

The data given in the foregoing table clearly shows that amounts of clay up to about 30% do not "dilute" the color of the pigment and may be used therefor with a considerable saving in cost of the finished product.

All of the calcinations performed in the preparation of the pigments of each of the four examples given above were done by placing either the pulverized precipitated cake or the admixed mass of Example 4 in a 35–15 stainless steel pan in which the material is packed as tightly as feasible. The pans were covered with tight fitting lids of stainless steel. During calcination the container should remain covered and should not be disturbed or agitated in any way. At the conclusion of the calcination step the pan is removed from the furnace and with the cover left on permitted to cool. When cool enough to handle, the mass is removed from the pan and ground in a suitable mill, preferably a wet ball mill. It has not been found necessary to employ any addition agents to the mill other than water. The pigment is ground in the ball mill until at least 95% will pass through a 200 mesh sieve. For certain purposes it may be desirable to grind even finer, i. e. so that at least 95% will pass through a 325 mesh screen.

The slurry from the ball mill containing the finely ground pigment is then dried. If there is any tendency to agglomerate during the drying of the pigment, any agglomerated masses may be broken up in a suitable pulverizer before the pigment is actually used.

The pigments of our invention may be incorporated in various organic high polymers such as those listed below.

Methyl methacrylate
   Polystyrene
   Cellulose acetate
   Cellulose acetate butyrate
   Polyamide
   Urea formaldehyde
   Melamine formaldehyde The pigments of our invention will also be found useful in coating materials such as porcelain enamel, ceramic clays, paints, etc.

Other modes of applying the principle of the invention may be employed, change being made as regards the details described, provided the features stated in any of the following claims, or the equivalent of such, be employed.

We therefore particularly point out and distinctly claim as our invention:

1. As a new highly saturated pigment from orange to dark red in color, relatively stable up to 1800° F. and relatively insoluble in water and organic solvents, the product produced by the calcination at a temperature of about 1100° F. for about 1.25 to about 3.50 hours of CdS, Se and at least one material of the class consisting of the clays, fuller's earth and diatomaceous earth, the mass containing from 9 to 1.25 parts CdS to one part Se and from 10% to 40% of at least one material of the class consisting of the clays, fuller's earth and diatomaceous earth.

2. As a new highly-saturated pigment from orange to dark red in color, relatively stable up to 1800° F. and relatively insoluble in water and organic solvents, the product produced by calcining at a temperature of about 1100° F. for about 1.25 to about 3.50 hours the mass resulting from the coprecipitation of the reaction products of a cadmium salt of sulphuric acid and sodium-seleno-sulphide in the presence of at least one material consisting of the clays, fuller's earth and diatomaceous earth, said materials present during the coprecipitation in such amount that said mass contains from 9 to 1.25 parts CdS to one part Se and from 10% to 40% of at least one material of the class consisting of the clays, fuller's earth and diatomaceous earth.

3. As a new highly-saturated pigment from orange to dark red in color, relatively stable up to 1800° F. and relatively insoluble in water and organic solvents, the product produced by calcining at a temperature of about 1100° F. for about 1.25 to about 3.50 hours the mass resulting from the co-precipitation of the reaction products of a cadmium salt of nitric acid and a water soluble seleno-sulphide in the presence of at least one material of the class consisting of the clays, fuller's earth and diatomaceous earth, said materials present during the co-precipitation in such amounts that said mass contains from 9 to 1.25 parts CdS to one part Se and from 10% to 40% of at least one material of the class consisting of the clays, fuller's earth and diatomaecous earth.

4. As a newly highly-saturated pigment from orange to dark red in color relatively stable up to 1800° F. and relatively insoluble in water and organic solvents, the product produced by calcining at a temperature of about 1100° F. for about 1.25 to about 3.50 hours the mass resulting from the co-precipitation of the reaction products of a cadmium salt of hydrochloric acid and a water soluble seleno-sulphide in the presence of at least one material consisting of the class of clays, fuller's earth and diatomaceous earth, said materials present during the co-precipitation in such amounts that said mass contains from 9 to 1.25 parts CdS to one part Se and from 10% to 40% of at least one material of the class consisting of the clays, fuller's earth and diatomaceous earth.

5. The process of producing a highly-saturated pigment from orange to dark red in color, relatively stable up to 1800° F. and relatively insoluble in water and organic solvents, which comprises co-precipitating the reaction products of a cadmium salt of a mineral acid and a water soluble seleno-sulphide in the present of at least one material of the class consisting of the clays, fuller's earth and diatomaceous earth, said materials present during the co-precipitation in such amounts that the resulting mass contains from 9 to 1.25 parts CdS to one part Se and from 10% to 40% of at least one material of the class consisting of the clays, fuller's earth and diatomaceous earth and then calcining the said mass at a temperature of about 1100° F. for about 1.25 to about 3.50 hours.

6. The process of producing a highly-saturated pigment from orange to dark red in color, relatively stable up to 1800° F. and relatively insoluble in water and organic solvents which comprises co-precipitating the reaction products of a cadmium salt of sulphuric acid and sodium seleno-sulphide in the presence of at least one material of the class consisting of the clays, fuller's earth and diatomaceous earth, said materials present during the co-precipitation in such amounts that the resulting mass contains from 9 to 1.25 parts CdS to one part Se and from 10% to 40% of at least one material of the class consisting of the clays, fuller's earth and diatomaceous earth and then calcining the said mass at a temperature of about 1100° F. for about 1.25 to about 3.50 hours.

7. The process of producing a highly-saturated pigment from orange to dark red in color, relatively stable up to 1800° F. and relatively insoluble in water and organic solvents, which comprises co-precipitating the reaction products of a cadmium salt of nitric acid and a water soluble seleno-sulphide in the presence of at least one material of the class consisting of the clays, fuller's earth and diatomaceous earth, said materials present during the co-precipitation in such amounts that the resulting mass contains from 9 to 1.25 parts CdS to one part Se and from 10% to 40% of at least one material of the class consisting of the clays, fuller's earth and diatomaceous earth and then calcining the said mass at a temperature of about 1100° F. for about 1.25 to about 3.50 hours.

8. The process of producing a highly-saturated pigment from orange to dark red in color, relatively stable up to 1800° F. and relatively insoluble in water and organic solvents which comprises co-precipitating the reaction products of a cadmium salt of hydrochloric acid and a water soluble seleno-sulphide in the presence of at least one material of the class consisting of the clays, fuller's earth and diatomaceous earth, said materials present during the co-precipitation in such amounts that the resulting mass contains from 9 to 1.25 parts CdS to one part Se and from 10% to 40% of at least one material of the class consisting of the clays, fuller's earth and diatomaceous earth and then calcining the said mass at a temperature of about 1100° F. for about 1.25 to about 3.50 hours.

ORVILLE O. KENWORTHY.
ERNEST H. GODA.
JACK D. GOLLAND.

No references cited.